United States Patent
Grabell et al.

(10) Patent No.: US 9,174,783 B1
(45) Date of Patent: Nov. 3, 2015

(54) REUSABLE GIFT WRAP

(71) Applicants: Stephanie Grabell, Bala Cynwyd, PA (US); Jodi Kahane, Melville, NY (US)

(72) Inventors: Stephanie Grabell, Bala Cynwyd, PA (US); Jodi Kahane, Melville, NY (US)

(73) Assignee: Wrapeez, LLC, Bala Cynwyd, PA (US)

( * ) Notice: Subject to any disclaimer, the term of this patent is extended or adjusted under 35 U.S.C. 154(b) by 0 days.

(21) Appl. No.: 13/666,311

(22) Filed: Nov. 1, 2012

Related U.S. Application Data

(60) Provisional application No. 61/554,659, filed on Nov. 2, 2011.

(51) Int. Cl.
| | |
|---|---|
| *B65D 65/38* | (2006.01) |
| *B65D 27/00* | (2006.01) |
| *B65D 30/00* | (2006.01) |
| *B65D 33/16* | (2006.01) |
| *B65D 75/00* | (2006.01) |
| *A45C 13/08* | (2006.01) |
| *A45C 13/40* | (2006.01) |
| *B65D 6/00* | (2006.01) |
| *A45C 7/00* | (2006.01) |
| *B65D 65/46* | (2006.01) |

(52) U.S. Cl.
CPC ..................... *B65D 65/46* (2013.01)

(58) Field of Classification Search
CPC .......................... Y10S 229/923; Y02W 30/807
USPC ........... 229/87.19, 87.03, 92.5; 383/2, 78, 80, 383/81, 37; 206/144, 155, 167; 150/105, 150/106, 113; 220/8; 190/104
See application file for complete search history.

(56) References Cited

U.S. PATENT DOCUMENTS

| | | | | |
|---|---|---|---|---|
| 2,296,830 | A * | 9/1942 | Beals | 206/264 |
| 3,064,876 | A * | 11/1962 | Warner | 229/125.19 |
| 4,099,666 | A * | 7/1978 | Welles | 383/105 |
| 4,294,360 | A * | 10/1981 | LeVeen | 206/438 |
| 4,583,679 | A * | 4/1986 | Johnson | 229/123.1 |
| 5,004,144 | A | 4/1991 | Selga | |
| 5,292,003 | A * | 3/1994 | Baghdassarian | 206/575 |
| 5,392,983 | A | 2/1995 | Clarke-Bolling et al. | |
| 5,443,205 | A * | 8/1995 | Robotham et al. | 229/243 |
| 5,456,062 | A | 10/1995 | Wechsler | |
| 5,529,395 | A | 6/1996 | French | |
| 5,542,169 | A * | 8/1996 | Weder | 29/469.5 |
| 5,718,100 | A | 2/1998 | Petty | |
| 5,743,458 | A | 4/1998 | French | |
| 5,836,508 | A * | 11/1998 | Savage | 229/103.3 |
| 5,904,289 | A | 5/1999 | Hagan | |
| 5,934,548 | A * | 8/1999 | Kenyon | 229/87.19 |
| 5,979,744 | A | 11/1999 | Brigleb | |
| 6,299,352 | B1 * | 10/2001 | Julien | 383/40 |
| 6,398,677 | B1 * | 6/2002 | Hergert et al. | 473/599 |
| 6,422,388 | B1 * | 7/2002 | McCahey | 206/457 |

(Continued)

*Primary Examiner* — Jes F Pascua
*Assistant Examiner* — Derek Battisti
(74) *Attorney, Agent, or Firm* — RatnerPrestia

(57) ABSTRACT

A reusable gift wrap assembly includes two discrete sleeves that are together configured to conceal exterior surfaces of a gift box upon covering the gift box with the sleeves. Each sleeve includes two material layers that are connected together along a portion of their perimeter so as to define an interior pocket and an open end through which the gift box is inserted. One of the sleeves includes a free open end that is positioned to at least partially overlap a free open end of other sleeve so as to conceal the free open end of the other sleeve when the sleeves are assembled onto a gift box. Each sleeve is formed from a resilient fabric material such that the sleeves can conform to gift boxes of varying shape and size.

7 Claims, 9 Drawing Sheets

(56) References Cited

U.S. PATENT DOCUMENTS

| | | | |
|---|---|---|---|
| 7,077,308 B2* | 7/2006 | Beach | 229/87.19 |
| D612,744 S | 3/2010 | Childs | |
| 7,926,702 B2 | 4/2011 | Childs | |
| 2007/0041670 A1 | 2/2007 | Spizman et al. | |
| 2007/0220838 A1* | 9/2007 | Wipf et al. | 53/558 |
| 2008/0152265 A1* | 6/2008 | Feeney | 383/61.3 |
| 2009/0022431 A1* | 1/2009 | Conner | 383/37 |
| 2010/0127055 A1* | 5/2010 | Zelina et al. | 229/116.5 |

* cited by examiner

REUSABLE GIFT WRAP

CROSS-REFERENCE TO RELATED APPLICATIONS

This application claims priority to U.S. Provisional Patent Application No. 61/554,659 filed on Nov. 2, 2011, which is incorporated by reference herein in its entirety.

FIELD OF THE INVENTION

The present invention relates generally to reusable gift wrap.

BACKGROUND OF THE INVENTION

As described in U.S. Pat. No. 5,392,983, packages can be gift wrapped using a number of separate steps and a variety of wrapping materials. The gift wrapping is normally cut to size before being folded around the package, then held in place while transparent adhesive tape is applied across the overlapping edges to secure the wrapping. The conventional wrapping process can be time consuming, cumbersome and wasteful. Disclosed herein is a practical, reusable gift wrap which fits a variety of box sizes and shapes.

SUMMARY OF THE INVENTION

A reusable gift wrap assembly includes two discrete sleeves that are together configured to conceal exterior surfaces of a gift box upon covering the gift box with the sleeves. Each sleeve includes two material layers that are sewn together along a portion of their perimeter so as to define an interior pocket and an open end through which the gift box is inserted. One of the sleeves includes a free end portion that is positioned to at least partially overlap a free end of other sleeve so as to conceal the free open end of the other sleeve when the sleeves are assembled onto a gift box. Corners that are disposed opposite the free, open end of each sleeve are rounded so as to conform to gifts of varying shape and size. Each sleeve is formed from a resilient fabric material such that the sleeves can conform to gifts of varying shape and size. A fastener is optionally provided on one sleeve and a mating fastener provided on the other sleeve for mating with the fastener to retain the gift wrap assembly on the gift box or for the purpose of storage.

BRIEF DESCRIPTION OF THE DRAWINGS

The invention is best understood from the following detailed description when read in connection with the accompanying drawings, with like elements having the same reference numerals. This emphasizes that according to common practice, the various features of the drawings are not drawn to scale. Included in the drawings are the following figures.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Figure 1:
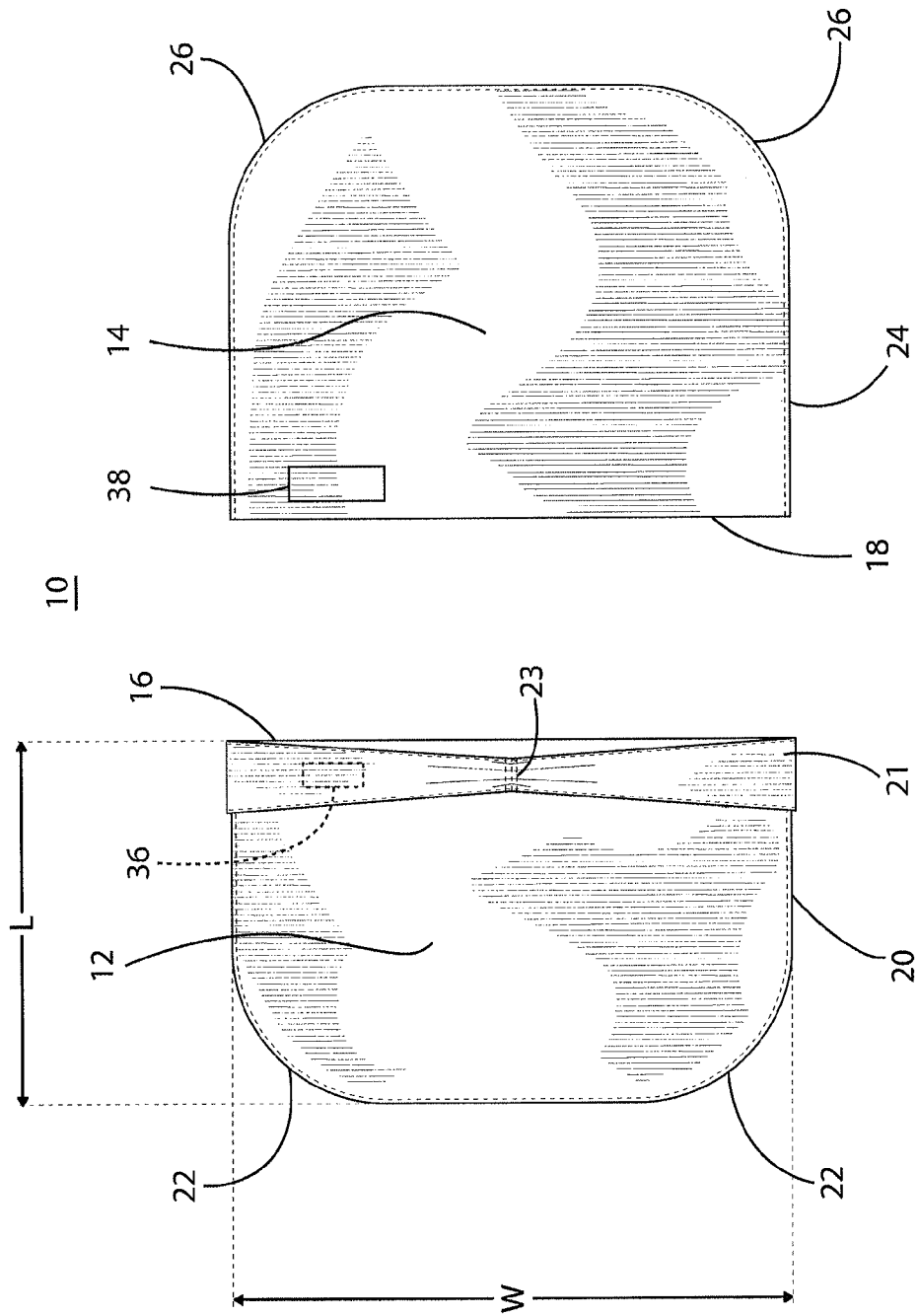
FIG. 1 depicts a top plan view of a reusable gift wrap, according to one exemplary embodiment of the invention.
Figure 2:
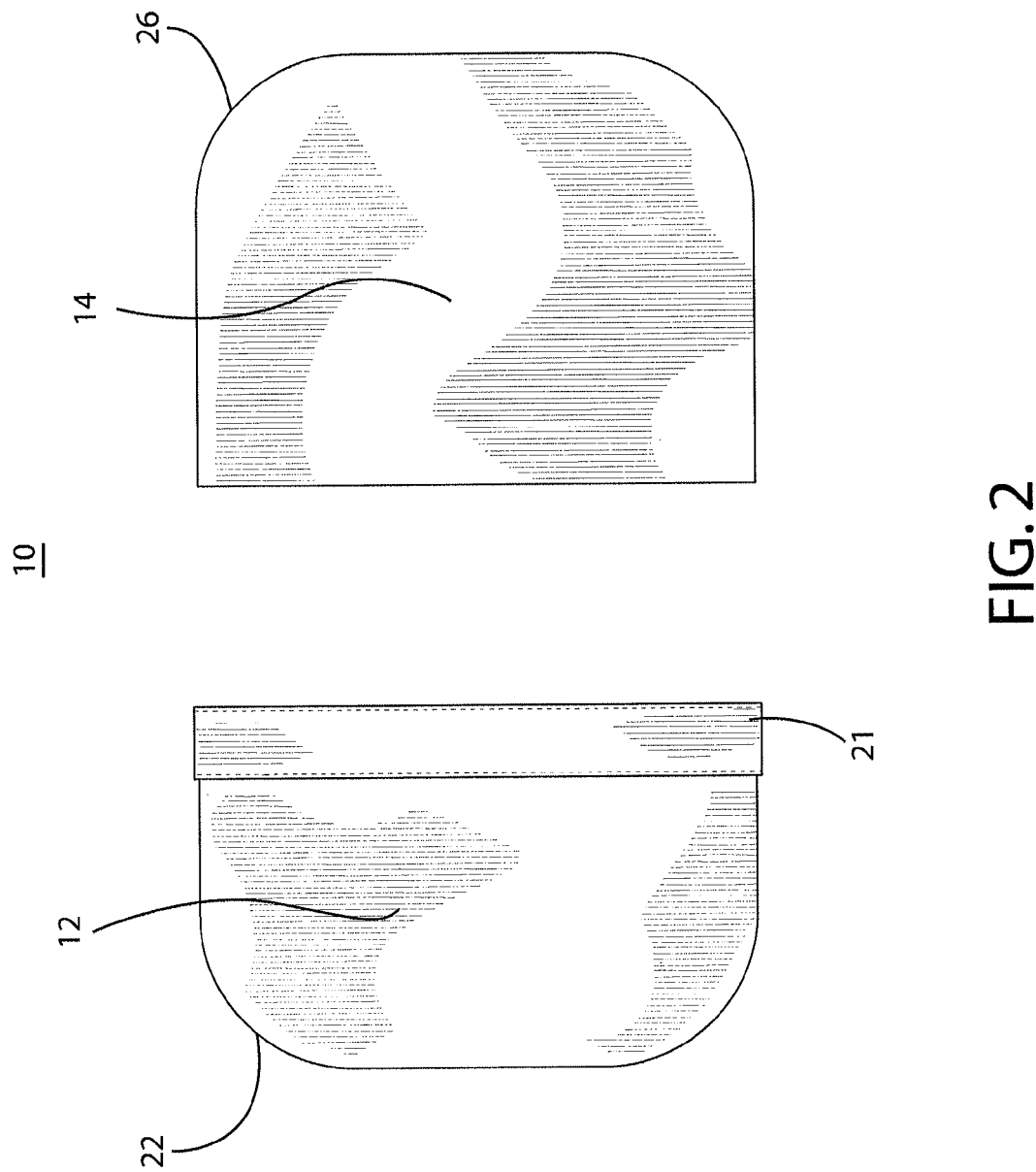
FIG. 2 depicts a bottom plan view of the reusable gift wrap of FIG. 1.
Figure 3:
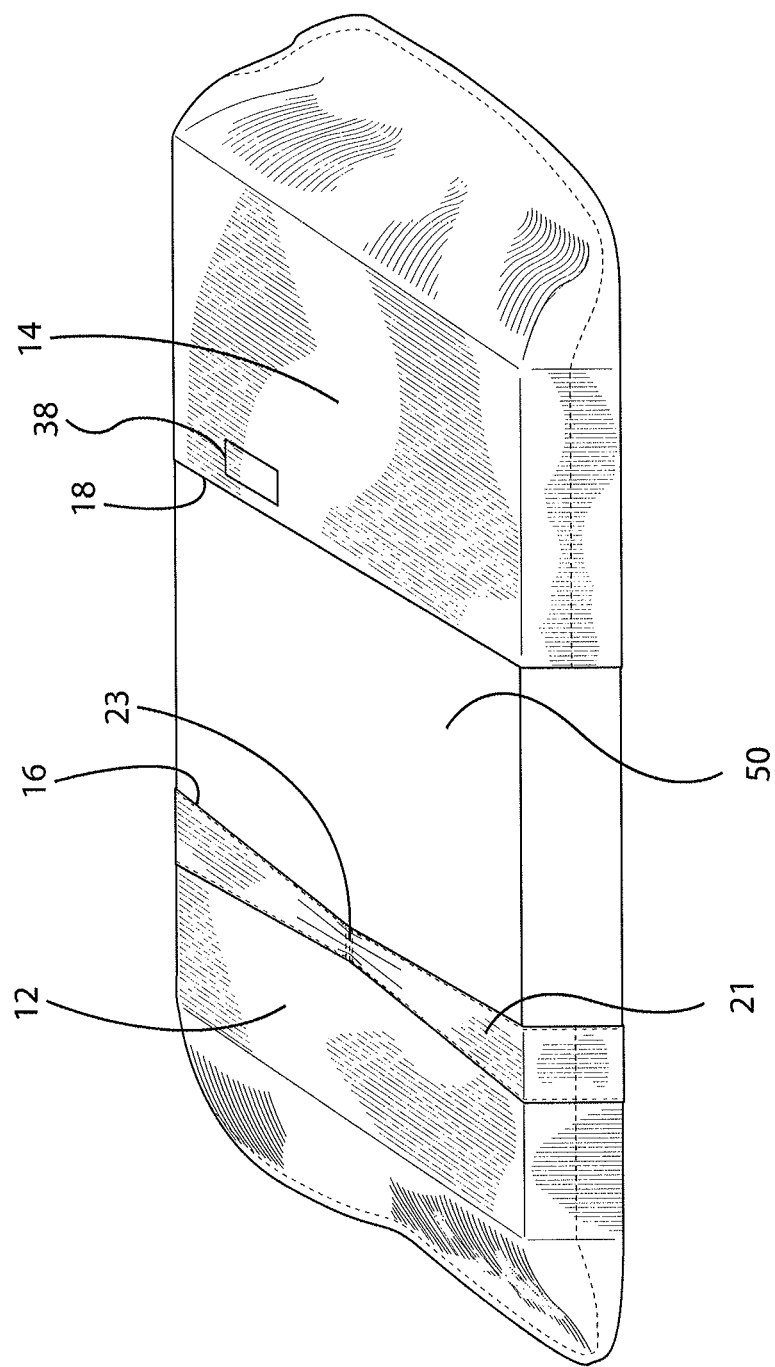
FIG. 3 depicts a perspective view of the reusable gift wrap of FIGS. 1 and 2 shown partially assembled onto a box.
Figure 4:
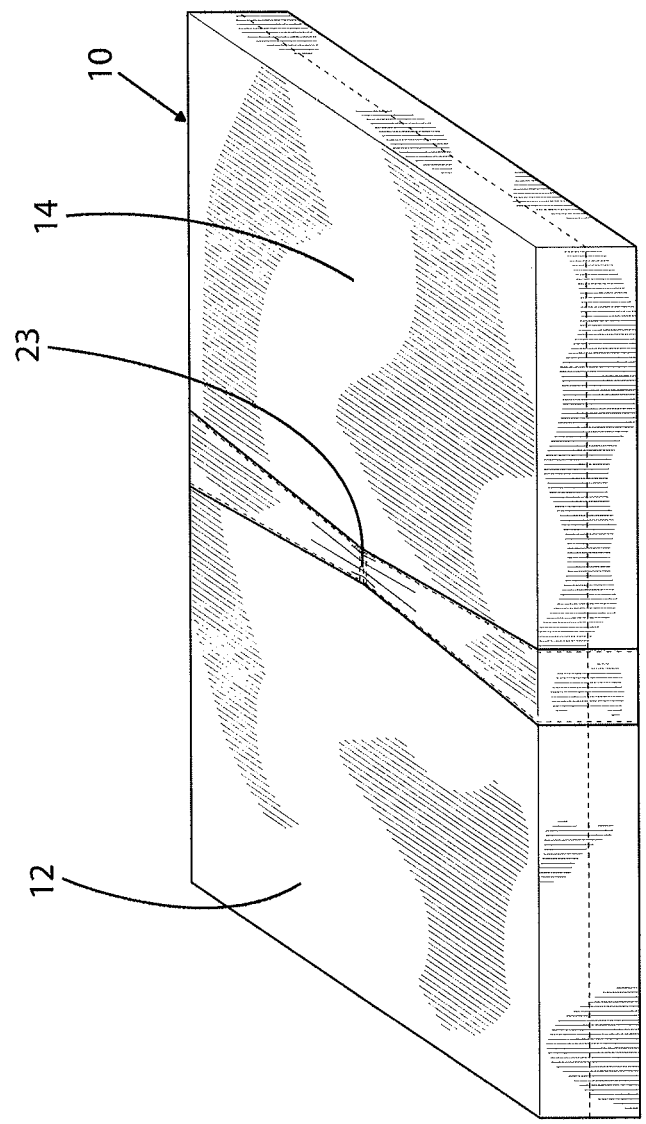
FIG. 4 depicts a perspective view of the reusable gift wrap of FIGS. 1 and 2 shown fully assembled onto the box.

FIG. 1 depicts a top plan view of a reusable gift wrap kit or assembly 10, according to one exemplary embodiment of the invention, and FIG. 2 depicts a bottom plan view of the reusable gift wrap assembly 10. The reusable gift wrap assembly 10 generally includes two discrete sleeves, i.e., top sleeve 12 and bottom sleeve 14, that are together configured to substantially conceal the exterior surfaces of a gift box 50 when the sleeves are positioned over the gift box 50. FIG. 3 is a perspective view of the reusable gift wrap assembly 10 shown partially assembled onto the gift box 50, and FIG. 4 is a perspective view of the reusable gift wrap assembly 10 shown fully assembled onto the gift box 50.

Each sleeve 12 and 14 includes two layers of material that are connected together along three sides of their perimeters 20 and 24 so as to define an interior pocket and an open end 16 and 18, respectively. The layers of material may be connected together by an adhesive or stitching, for example. The stitching is represented by dashed lines in FIGS. 1 and 4. The two layers of material of each sleeve may be formed from either one or two material sheets.

Each sleeve 12 and 14 includes two opposing rounded corners 22 and 26 that are disposed opposite the open ends 16 and 18, respectively. In contrast to straight corners, the rounded corners 22 and 26 are form fitting so as to conform to gifts of varying shape and size.

The top sleeve 12 includes a folded end portion 21. The folded end portion 21 is sewn at two places along the perimeter edge 20 of the sleeve 12, as shown in FIG. 1. Material at the central region of the folded end portion 21 is gathered and sewn together so as to form an embellished ribbon-like surface 23. Although not shown, additional material may be gathered at the central region of the folded end portion 21 so as to form a built-in bow. The ribbon-like surface 23 is an optional feature of the folded end portion 21 and may be omitted such that the central region of the folded end portion 21 appears flat.

In use, the ends of the gift box 50 are inserted through the open ends 16 and 18 of the sleeves 12 and 14, respectively, as shown in FIG. 3, and the folded end portion 21 is positioned over the open end 18 of the sleeve 14 to conceal the open end 18 of the sleeve 14. Positioning the folded end portion 21 over the open end 18 of the sleeve 14 creates a smooth and visually appealing transition between the sleeves 12 and 14 (see FIG. 4). In assembled form, the sleeves 12 and 14 conceal the entire exterior surface of the gift box 50.

The length 'L' and width 'W' dimensions of the sleeves 12 and 14 are sized to conform to gift boxes of various sizes and shapes. The width 'W' dimension of the sleeves 12 and 14 are substantially equal, whereas the length dimension 'L' of the sleeves 12 and 14 may be unequal. The length 'L' of the sleeves 12 and 14 are selected such that, upon assembling the sleeves 12 and 14 onto a gift box, the folded end portion 21 of the top sleeve 12 at least partially overlaps the free and open end 18 of the bottom sleeve 14. Depending upon the size of the gift box, the folded end portion 21 of the top sleeve 12 may be positioned in the approximate center of the gift box (as shown in FIG. 4) or at a location that is offset from the center of the gift box.

The sleeves 12 and 14 may be formed from a variety of resilient fabric materials that are sufficiently robust so as to withstand repeated uses on gift boxes of varying size. The sleeve material may also be recyclable. For example, each sleeve 12 and 14 may be formed from Lycra, Elastane or Spandex. The use of a stretchable, resilient material allows the reusable gift wrap assembly 10 to be smaller than the gift box 50 being wrapped. This also allows the gift wrap assembly 10 to be used with multiple shapes and sizes of gift boxes or other items.

Ornamental aspects of the reusable gift wrap assembly 10 may be protected by one or more co-pending design patent applications. The sleeves 12 and 14 may have the same color, design and/or pattern. Alternatively, the sleeves 12 and 14 may have different colors, designs, patterns, etc. Although not shown, a variety of embellishments may be applied to the exterior surface of the reusable gift wrap assembly 10, such as buttons, bows, charms, ribbons, flowers, coins, cards, notes, tags, themed items, seasonal items and/or feathers, for example.

The sleeves 12 and 14 may be retained on the gift box 50 merely by their elastic force. Alternatively, the sleeves 12 and 14 may be fastened together by fasteners 36 and 38 that are provided on the sleeves 12 and 14, respectively, to retain the sleeves on the gift box 50. More particularly, one or more fasteners 36 are provided on the interior surface of the top sleeve 12 and one or more mating fasteners 38 are provided on the exterior surface of the bottom sleeve 14. The fasteners 36 and 38 may also be useful for mating the sleeves together upon storing the reusable gift wrap assembly 10 to ensure that the sleeves 12 and 14 remain together. The fasteners may be buttons, double sided tape, Velcro, clasps, for example, or any other fastening mechanism that is known to those skilled in the art. It should be understood that the fasteners 36 and 38 are optional features of the design, and may be omitted.

Figure 9:
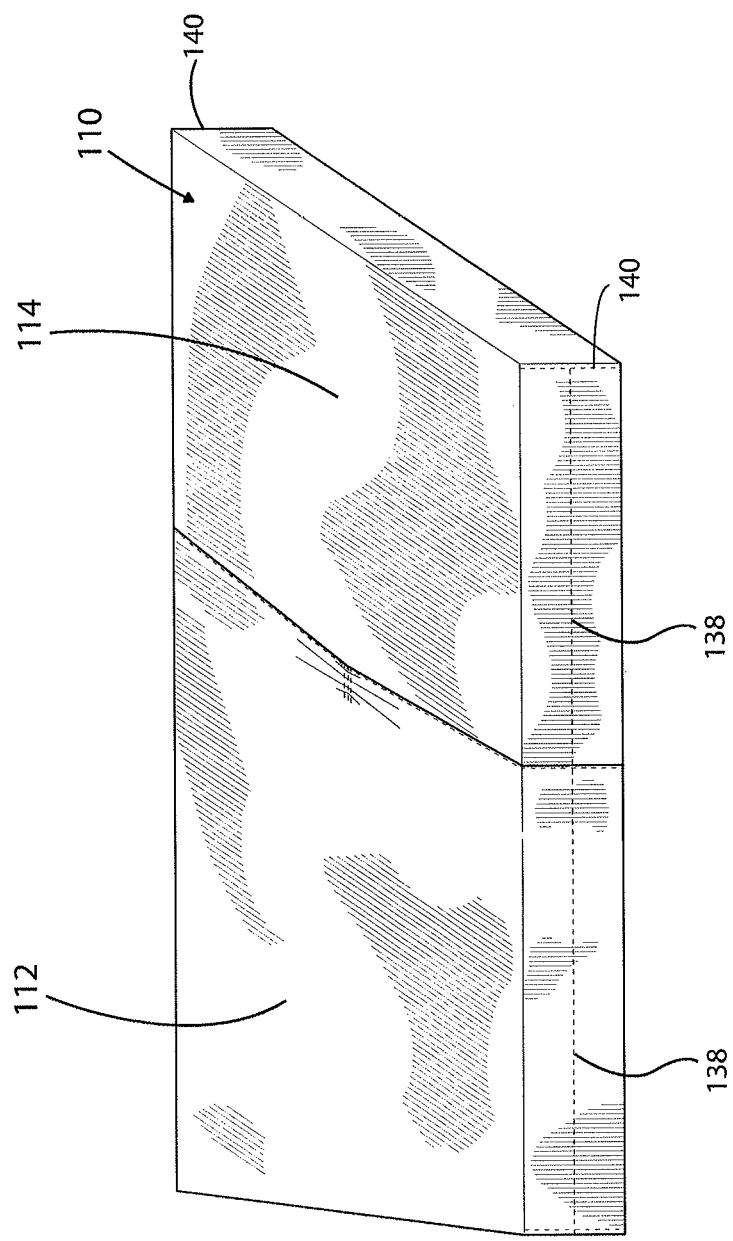
FIG. 9 depicts a perspective view of the reusable gift wrap of FIG. 5 shown fully assembled onto a irregular-shaped box.

FIGS. 5-8 depicts a reusable gift wrap 110, according to another exemplary embodiment of the invention, and FIG. 9 depicts a perspective view of the reusable gift wrap 110 shown fully assembled onto a irregular-shaped box. The reusable gift wrap 110 of FIGS. 5-9 is substantially similar to the reusable gift wrap 10 of FIGS. 1-4, and only the differences between those reusable gift wraps will be described hereinafter.

As best shown in FIG. 9, a seam 138, which is represented by a broken line, extends along the front and rear sides of the sleeves 110 and 112. At both rounded corners of each sleeve 110 and 112, another seam 140 extends perpendicular to the side seam 138. By virtue of the seams 138 and 140, each sleeve 110 and 112 can be manufactured from a single sheet of material. The overall shape of the single sheet of material be square, rectangular, ovular, triangular, semi-circular, etc.

Material at the central region of the free end 121 of the sleeve 112 is gathered and sewn together so as to form an embellished ribbon-like surface 123. The free end 121 of the sleeve 112 is not folded like the free end of the sleeve 12 of FIGS. 1-4. This represents a material savings.

Figure 5:
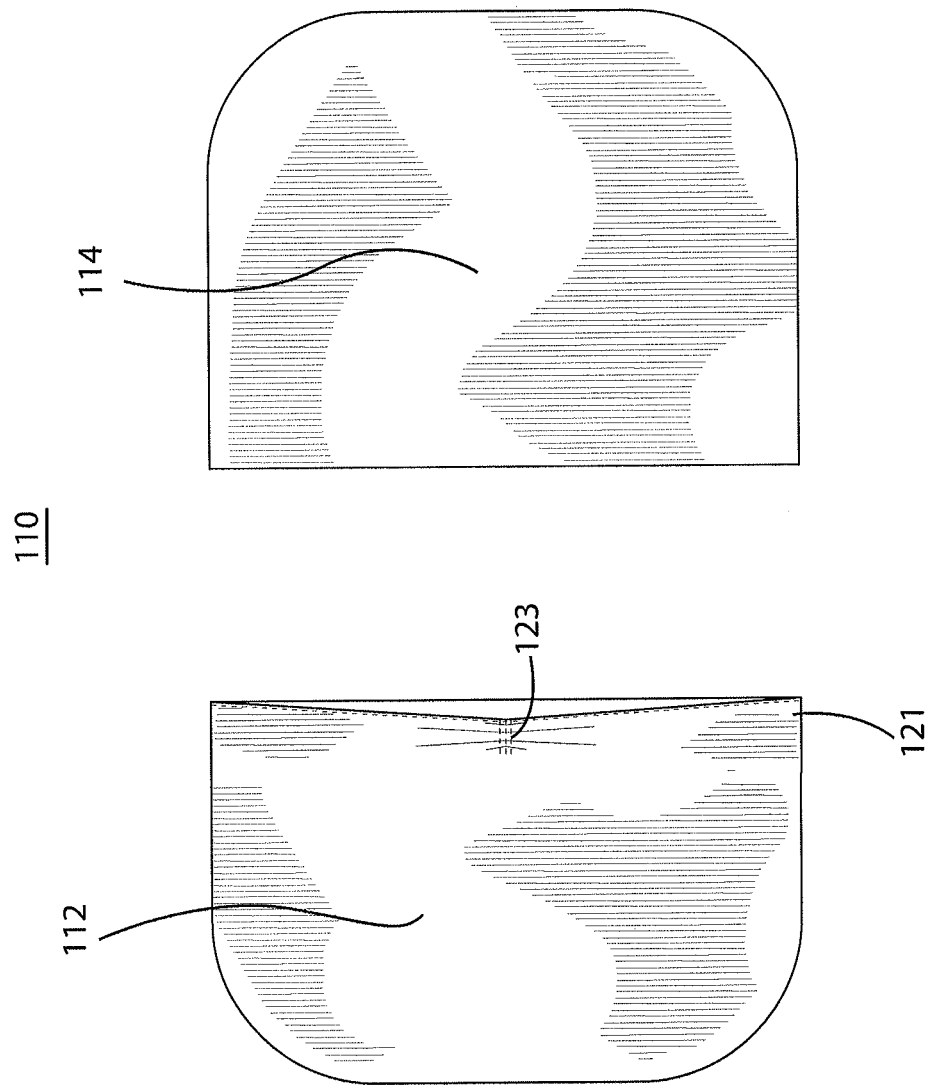
FIG. 5 depicts a top plan view of a reusable gift wrap, according to another exemplary embodiment of the invention.
Figure 6:
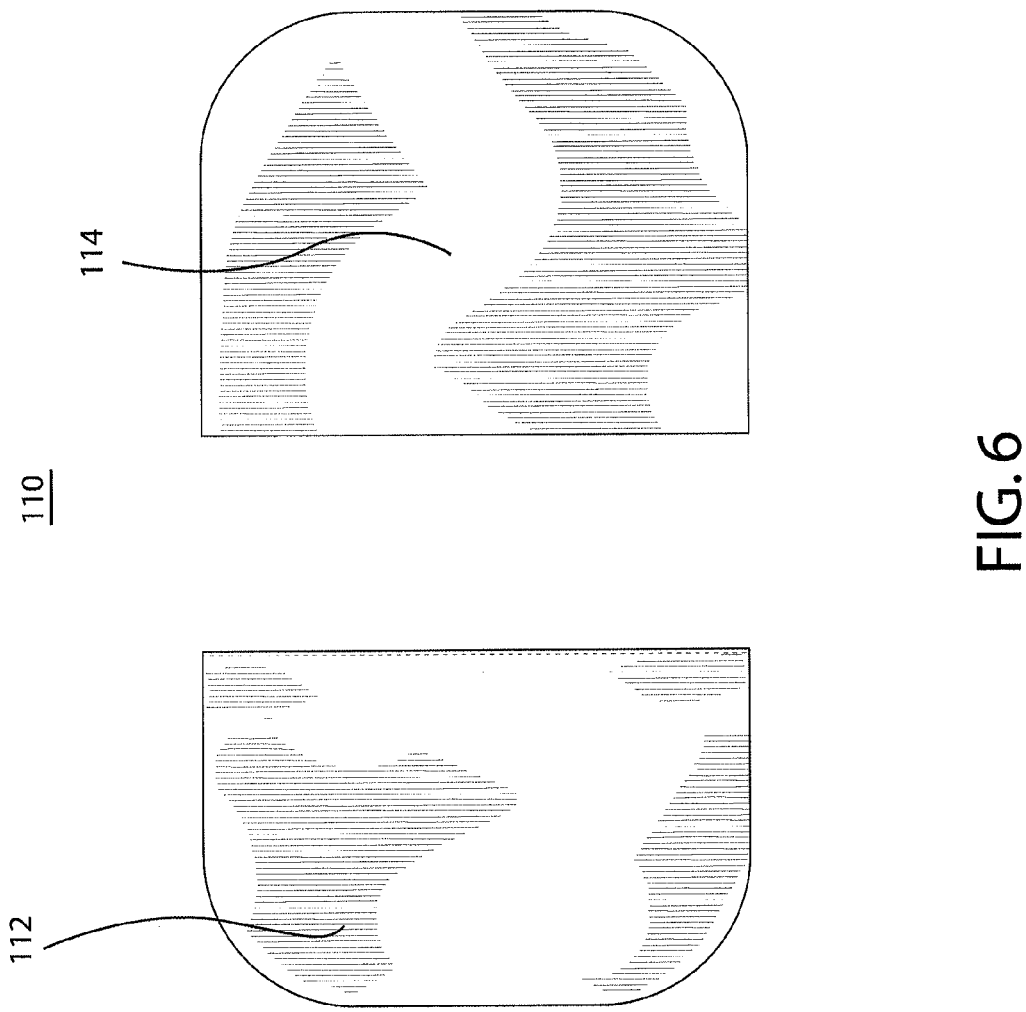
FIG. 6 depicts a bottom plan view of the reusable gift wrap of FIG. 5.
Figure 7:
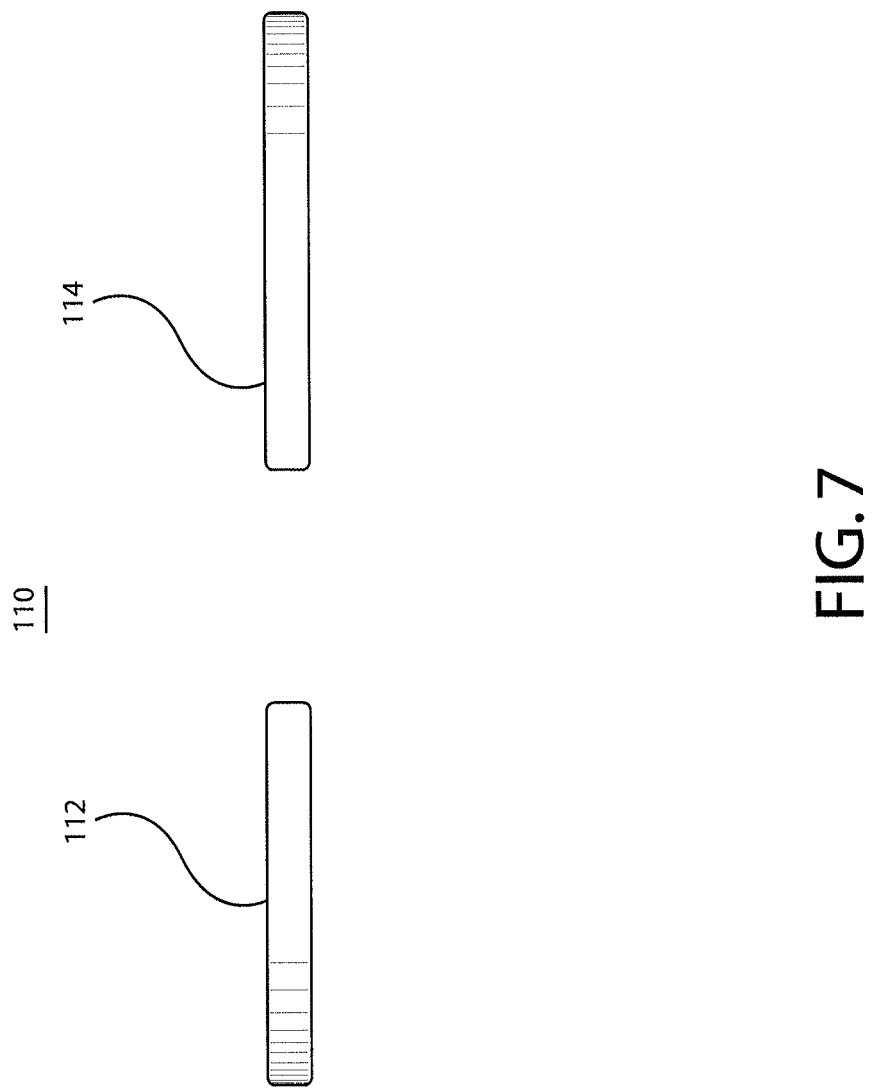
FIG. 7 is a front elevation view of the reusable gift wrap of FIG. 5, the rear elevation view being a mirror image thereof.
Figure 8:
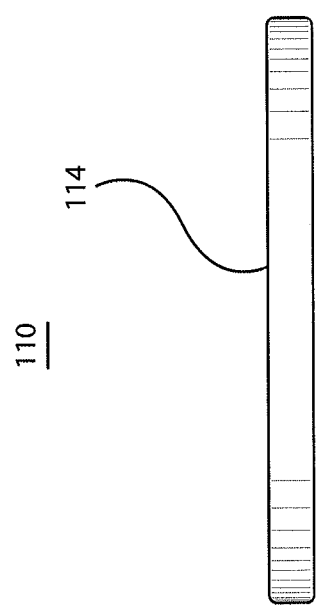
FIG. 8 is a right side elevation view of the reusable gift wrap of FIG. 5, the left side elevation view being a mirror image thereof.

As noted above, the sleeves of FIGS. 1-9 are configured to hold and conform to items of various shapes and sizes, such as, for example, a rectangular box (such as a wide shoe box), a square box, a trapezoidal box or any other shape. It may be necessary to push the sewn corners of the sleeves inward when it contains a wide shoe box, for example, so that the sewn corners of the sleeves closely enfold the corners of the box. By way of example, FIG. 9 depicts a perspective view of the reusable gift wrap 110 of FIG. 5 shown fully assembled onto a trapezoid shaped box.

Although the present invention has been particularly described in conjunction with specific embodiments, it is evident that many alternatives, modifications, and variations will be apparent to those skilled in the art. It is therefore contemplated that the appended claims will embrace any such alternatives, modifications, and variations as falling within the true scope and spirit of the present invention.

What is claimed:

1. A removable and reusable gift wrap assembly comprising two discrete sleeves that are together configured to hide exterior surfaces of a gift box upon covering the gift box with the sleeves, wherein each sleeve is formed from a resilient and stretchable fabric material such that the sleeves can stretch to conform to gift boxes of varying shape and size and such that the sleeves can be removed and reused, wherein each sleeve includes a closed end and a free open end, wherein a free open end of one of the sleeves is positioned to at least partially overlap a free open end of the other sleeve so as to conform to varying sizes of gift boxes and hide the free open end of the other sleeve when the sleeves are assembled onto the gift box, and wherein the at least partially overlapping free end is gathered so as to form an embellished ribbon-like surface on the overlapping free end of said one of the sleeves.

2. The reusable gift wrap assembly of claim 1, wherein the at least partially overlapping free end is folded.

3. The reusable gift wrap assembly of claim 1, wherein each sleeve includes an interior pocket and a free, open end through which the gift box is inserted.

4. The reusable gift wrap of claim 3, wherein corners that are disposed opposite the free, open end of each sleeve are rounded so as to conform to gifts of varying shape and size.

5. The reusable gift wrap assembly of claim 3, wherein each sleeve comprises two material layers that are connected together along a portion of their perimeter so as to define the interior pocket and the free, open end.

6. The reusable gift wrap assembly of claim 1, wherein lengths of the sleeves are unequal.

7. The reusable gift wrap assembly of claim 1 further comprising a fastener provided on one sleeve and a mating fastener provided on the other sleeve for releasably mating with the fastener to retain the gift wrap assembly on the gift box.

* * * * *